United States Patent
Shore et al.

(10) Patent No.: US 11,625,900 B2
(45) Date of Patent: Apr. 11, 2023

(54) BROKER FOR INSTANCING

(71) Applicant: Unity Technologies SF, San Francisco, CA (US)

(72) Inventors: Nick S. Shore, Wellington (NZ); Oliver M. Castle, Wellington (NZ); Timothy E. Murphy, Wellington (NZ)

(73) Assignee: Unity Technologies SF, San Francisco, CA (US)

( * ) Notice: Subject to any disclaimer, the term of this patent is extended or adjusted under 35 U.S.C. 154(b) by 0 days.

(21) Appl. No.: 17/077,992

(22) Filed: Oct. 22, 2020

(65) Prior Publication Data

US 2021/0241539 A1 Aug. 5, 2021

Related U.S. Application Data

(60) Provisional application No. 62/968,952, filed on Jan. 31, 2020.

(51) Int. Cl.
*G06T 19/20* (2011.01)

(52) U.S. Cl.
CPC .......... *G06T 19/20* (2013.01); *G06T 2200/24* (2013.01); *G06T 2210/61* (2013.01);
(Continued)

(58) Field of Classification Search
CPC ............... G06T 19/20; G06T 229/2016; G06T 2219/2004; G06T 2200/24; G06T 2219/2012; G06T 2210/62; G06T 2210/61

See application file for complete search history.

(56) References Cited

U.S. PATENT DOCUMENTS

| | | | |
|---|---|---|---|
| 9,230,241 B1* | 1/2016 | Singh | H04N 7/147 |
| 2014/0310746 A1* | 10/2014 | Larsen | H04N 21/242 |
| | | | 725/37 |

(Continued)

FOREIGN PATENT DOCUMENTS

WO 2016/149230 A1 9/2016

OTHER PUBLICATIONS

Raluca Mihaela Andrei, "Intuitive visualization of surface properties of biomolecules", Scuola Normale Superiore di Pisa, 2012 (Year : 2012).*

(Continued)

*Primary Examiner* — YuJang Tswei
(74) *Attorney, Agent, or Firm* — Haynes and Boone, LLP

(57) ABSTRACT

A first set of instance layer data that describes a scene to be represented by one or more computer-generated images is obtained. The set of instance layer data specifies a plurality of object instances within the scene, with each instance of the plurality of object instances corresponding to a position that an instance of a digital object is to appear in the scene. The set of instance layer data further specifies a first set of characteristics of the plurality of object instances that includes the position. A second set of instance layer data that indicates changes to be made to the scene described by the first set of instance layer data is obtained. A third set of instance layer data is generated to include the changes to the scene by overlaying the second set of instance layer data onto the first set of instance layer data. The scene is caused to be rendered by providing the third set of instance layer data to an instancing service.

26 Claims, 13 Drawing Sheets

(52) U.S. Cl.
CPC .. *G06T 2210/62* (2013.01); *G06T 2219/2004* (2013.01); *G06T 2219/2012* (2013.01); *G06T 2219/2016* (2013.01)

(56) References Cited

U.S. PATENT DOCUMENTS

| | | | | |
|---|---|---|---|---|
| 2015/0294498 | A1* | 10/2015 | Mei | G06T 15/005 |
| | | | | 345/420 |
| 2019/0028637 | A1* | 1/2019 | Kolesov | H04N 5/23293 |
| 2019/0206113 | A1* | 7/2019 | Kipp | G06T 15/80 |
| 2019/0313059 | A1* | 10/2019 | Agarawala | H04L 67/142 |
| 2019/0354793 | A1* | 11/2019 | Biswas | G06T 11/60 |
| 2020/0004759 | A1* | 1/2020 | Brebner | G06F 16/245 |
| 2021/0264649 | A1* | 8/2021 | Gori | G06T 11/60 |

OTHER PUBLICATIONS

International Search Report dated Feb. 11, 2021 in PCT Application No. PCT/NZ2020/050137.

* cited by examiner

BROKER FOR INSTANCING

CROSS REFERENCE TO RELATED APPLICATIONS

This application claims the priority benefit of U.S. Provisional Patent Application No. 62/968,952 to Jan. 31, 2020, hereby incorporated by reference in its entirety as though fully set forth herein.

FIELD OF THE INVENTION

The present disclosure generally relates to management of assets used to construct digital animation sequences. The disclosure relates more particularly to apparatus and techniques for managing instances of objects that might be stored as nested structures and be amenable to modifications.

BACKGROUND

As digital animation in film and other media becomes more and more prevalent, so too is the complexity of the digital effects increasing. When simulating a large number of similar-looking physical objects, instancing is often used to make copies of the same object throughout the scene. Combining data from various sources into data for instancing can be tedious and impractical, given time constraints in digital animation production. Furthermore, digital animation commonly involves teams of digital artists each making contributions to the scene, and if one team of digital artists attempt to customize some of the copies of the objects so that they are not all identical, this can interfere with work being done by another team of digital artists. Conversely, work being done by the other team of digital artists might overwrite the customizations of the first team. Improved methods and apparatus for handling digital effects creation using instances might be desired.

SUMMARY

The instancing broker or instance broker disclosed herein has particular, but not exclusive, utility for rendering computer-generated images that include contributions made by different people or groups, or at different times, or from different locations.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method under the control of one or more computer systems configured with executable instructions: (a) obtaining a first set of instance layer data that describes a scene to be represented by one or more computer-generated images, the first set of instance layer data specifying: (1) a plurality of object instances within the scene, each instance of the plurality of object instances corresponding to a placement that an instance of a digital object is to appear in the scene; and (2) a first set of characteristics of the plurality of object instances that includes the placement. The computer-implemented method also includes (b) obtaining a second set of instance layer data that indicates changes to be made to the scene described by the first set of instance layer data; (c) generating a third set of instance layer data that includes the changes to the scene by overlaying the second set of instance layer data onto the first set of instance layer data, and (d) causing the scene to be rendered by providing the third set of instance layer data to an instancing service. Other embodiments of this aspect include corresponding computer systems, apparatus, and computer programs recorded on one or more computer storage devices, each configured to perform the actions of the methods.

Implementations may include one or more of the following features. The changes to the scene may include adding an additional instance to the plurality of object instances. Generating the third set of instance layer data can include, as a result of determining that the second set of instance layer data is additive, adding the second set of instance data to the third set of instance layer data. The changes to the scene may include a customization to a characteristic of the first set of characteristics. Generating the third set of instance layer data can include, as a result of determining that the second set of instance layer data includes the customization, applying the customization to the characteristic of the first set of characteristics. The customization can include changes to an object instance including changes to at least one of a position, an orientation, a size, a scale, a dimension, a color, a texture, a shading, a direction of motion, a rate of motion, a rate of rotation, a motion blur, a reflectiveness, a transparency, an animation sequence, or an object data source. The customization can include adding or removing an object instance. The customization can include or adding or removing an attribute from an object instance.

One or more services can be configured to perform the computer-implemented method. A non-transitory computer-readable storage medium can carry instructions that, as a result of execution by one or more processors of a computer system, cause the computer system to perform the computer-implemented method. A computer readable medium can carry instructions that, when executed by at least one processor of a computer system, cause the computer system to carry out the method. A computer system may include at least one processor; and a computer readable medium carrying instructions that, when executed by the at least one processor, cause the computer system to carry out the method. A user interface may be configured to receive instructions from a user to execute the method.

The computer-implemented method may further include obtaining a fourth set of instance layer data that indicates changes to be made to the scene described by the first set of instance layer data; and generating a fifth set of instance layer data that includes the changes to the scene by overlaying the fourth set of instance layer data onto the first and second sets of instance layer data. Generating the fifth set of instance layer data nay include, as a result of determining that the fourth set of instance layer data is additive, adding the additional instance data to the third set of instance layer data. The method may include, as a result of determining that the fourth set of instance layer data includes a conflict with the second set of instance layer data, resolving the conflict. Resolving the conflict may include comparing a priority of the fourth set of instance layer data with a priority of the second set of instance layer data. Resolving the conflict may include comparing a modification time of the fourth set of instance layer data with a modification time of the second set of instance layer data. Resolving the conflict may include prompting a user. Generating the fifth set of instance layer data may include, as a result of determining that the fourth set of instance layer data is not additive, determining whether the fourth set of instance layer data conflicts with the second set of instance layer data. The computer-implemented method can further include obtaining a fourth set of instance layer data that indicates changes to be made to the scene described by the second set of instance layer data; and generating a fifth set of instance layer data that includes the changes to the scene by overlaying the fourth set of instance layer onto the first and second sets of instance layer data. The method may also include translating at least some of the sets of instance layer data into a format usable by a software application. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the instancing broker, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which:

FIG. 2 shows an example of an interface for independently customizing instances in accordance with an embodiment.

DETAILED DESCRIPTION

Figure 1:
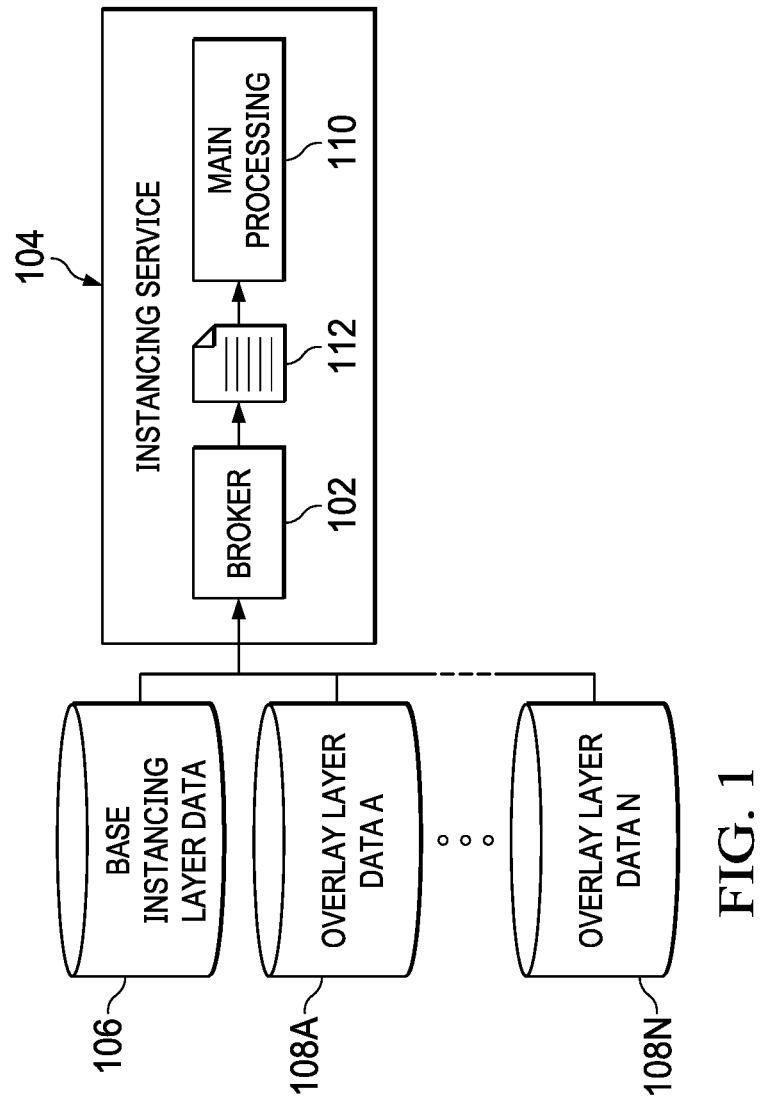
FIG. 1 shows, in bock diagram form, an instancing broker acting as an intermediary between the instancing service and the instancing layer data in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques and systems described below relate to a tool that combines different sources of instancing data, resolves conflicts between the different sources, and provides the combined instancing data to an instancing service. In digital imagery creation, such as digital animation, an artist or other operator might wish to construct a scene description that could be used to render computer-generated imagery. For example, the operator might construct a scene description that describes a view of a three-dimensional (3D) space into which multiple instances of a "tree" object are placed at specified locations in the 3D space, along with multiple instances of a "rock" object and one or more character objects, along with other objects. A typical scene description might involve a large number of instances of objects. An overhead view of a scene of a city might require descriptions of many buildings, vehicles, roads, etc., and it could be quite tedious to have to individually describe each item in the scene. It can be less tedious if multiple identical instances of a given object are used, in which case perhaps all the input that is needed is a placement, but then all those instances might look identical and lead to an unrealistic scene. In some embodiments, a placement may for example be a matrix (e.g., a 4×4 matrix) that includes such information about an object instance as its position, orientation, scale, and skew. In some embodiments, scale or skew can be applied non-uniformly on different axes in order to change the shape of an object. An animation artist might want the simplicity of having instances of objects, but also an ability to customize instances by changing placement values or other properties, while still having those customized instances logically connected to their origin objects so that changes to the origin objects propagate as expected or desired.

In one example, a first set of instance layer data that describes a scene to be represented by one or more computer-generated images is obtained. In the example, the set of instance layer data specifies a plurality of object instances within the scene, with each instance of the plurality of object instances corresponding to a position that an instance of a digital object is to appear in the scene. In the example, the first set of instance layer data further specifies a first set of characteristics of the plurality of object instances that includes the position.

Further to the example, a second set of instance layer data that indicates changes to be made to the scene described by the first set of instance layer data is obtained. Still in the example, a third set of instance layer data is generated to include the changes to the scene by overlaying the second set of instance layer data onto the first set of instance layer data. Finally, in the example, the scene is caused to be rendered by providing the third set of instance layer data to an instancing service.

In some examples, "object" refers to a mathematical representation of a two-dimensional or three-dimensional physical item or being. The representation might be stored as a mesh of vertices defining a tessellated manifold of a boundary for the object, and a texture for coloring that boundary. In some examples, a "mesh" refers to a collection of vertices, edges, and/or faces that defines the shape of a polyhedral object in computer graphics modeling. In some examples, a "sub-object" refers to a constituent part of the digital object that itself is a digital object. Digital objects and sub-objects may be nested in a hierarchy; for example a handle object may be a sub-object of a door object, which itself may be a sub-object of a house object, which itself may be a sub-object of a neighborhood block object, which itself may be a sub-object of a city object, and so on.

In some examples, "geometry instancing" (or "instancing" for short) refers to the rendering of multiple copies of the same computer graphics mesh in a scene at once. In some examples, a "scene" refers to a virtual workspace for editing and/or rendering a three-dimensional project. In some examples, an "interface" refers to computer hardware or software designed to communicate information between hardware devices, between software programs, between devices and programs, or between a device and a user.

In some examples, an "instance" (also referred to as an "object instance") may refer to data that references the digital object (e.g., file storage location of the particular object mesh) and indicates a position at which to place a representation of a digital object within a scene and may also include other duplicated data (e.g., vertex data, etc.) of the digital object itself, but may have other attributes (e.g., scale, dimensions, color, position orientation, animation, pose, etc.) separate from or in addition to the object data. In some examples, "instantiate" refers to an electronic computing device creating an "instance" of a digital object (e.g., generating a set of data corresponding to the particular instance within the scene).

In some examples, a "layout" refers to a particular arrangement of one or more objects. The layout may be instanced as multiple copies in different locations within a scene. In some examples, a "customization" refers to a modification of a characteristic of an object instance to be different from the characteristic of a parent object from which the digital object was derived. In some examples, a "characteristic" of an object instance refers to an attribute or other feature specific to the object instance; for example, a characteristic can include, but not be limited to, a size, a dimension, a color, a texture, a direction of motion, rate of motion, rate of rotation, motion blur, reflectiveness, transparency, an animation sequence, and so on. Further, a customization may include adding or removing/deleting a digital object or sub-object from a layout or adding or removing an attribute from an object instance.

In some examples, a "base instance layer" (also referred to as a "default" layer) is structured data defining a set of object instances in a scene at an initial state (e.g., before any overlay or additional instance data is applied or added/appended). In some examples, an "overlay layer" refers to data of a set of attributes of one or more object instances that, when applied, overwrite corresponding attribute data of the current instancing state and/or add additional instances to the current instance data. In some examples, a "regular" overlay layer refers to overlay data that has updated attribute data for existing layers in the current instancing state. In some examples, an "additive" overlay layer refers to overlay data that adds additional instances to the current instancing state; in addition to adding additional instances, an additive overlay layer may or may not include overlay data that has updated attributed data for existing instances in the current instancing state.

In some examples, a "service" refers to an executing computer software application that provides functionality to another computer software application. In some examples, a "client" (or "client device") refers to a computer system that utilizes the aforementioned service.

Techniques described and suggested in the present disclosure improve the field of computing, especially the field of digital animation, by providing a tool for combining various portions of hierarchical instance data in a non-destructive (e.g., to the instance hierarchy) way Additionally, techniques described and suggested in the present disclosure improve the efficiency of digital animation systems by allowing customized instancing data to be stored in a separate data structure from non-customized instancing data, thereby achieving a reduction in storage space, memory space, and rendering time for the set of object instances. Moreover, techniques described and suggested in the present disclosure are necessarily rooted in computer technology in order to overcome problems specifically arising with compatibility between different instancing applications, and do so by providing an instance broker that, in addition to combining portions of instancing data from various sources, may normalize the instancing data from the various sources into a format that is compatible with the particular instancing software application being used.

FIG. 1 illustrates an example, in bock diagram form, of an instance broker combining multiple overlay layers into instance data to be processed by an instancing service in accordance with an embodiment of the present disclosure. Specifically, FIG. 1 depicts an instance broker 102 combining data from multiple instance data sources, including base instancing layer data 106 and a set of overlay layer data 108A-108N, into instancing data 112 and providing the instancing data 112 to a main processing component 110 of an instancing service 104.

The instance broker 102 may be a software application/agent that obtains one or more portions of instancing data of a digital animation scene, such as the base instancing layer data 106 and the set of overlay layer data 108A-108N, combines the portions of instancing data while resolving any conflicts between the portions of data, and provides the combined instancing data to the main processing component 110 of the instancing service 104. In various implementations, the instance broker 102 is implemented in software or hardware. In some embodiments, the instance broker 102 is a software plug-in to the instancing service 104 application. Additionally or alternatively, the instance broker 102 may execute as a separate service and/or on a separate computer system from the instancing service 104.

In some cases, some of the overlay layer data of the set of overlay layer data 108A-108N may conflict with other overlay layer in the set of overlay layer data 108A-108N. In such cases, the instance broker 102 may resolve the conflict in any of a variety of ways. For example, the instance broker 102 may determine that the overlay layer data associated with a foremost priority, as indicated by a higher (or lower, depending on implementation) priority value, supersedes other overlay layer data associated with less significant priority value. As another example, the instance broker 102 may determine that the most recently modified overlay layer data may supersede older overlay layer data. Other methods of resolving conflicts are likewise contemplated.

The base instancing layer data 106 may be a set of instancing data stored in persistent storage on one or more host computer systems. The set of instancing data may specify a set of instances for a digital animation scene, their respective object data sources (e.g., where the object mesh data is stored), their respective positions and/or orientations within the scene, and/or their respective scales within the scene, as well as any customizations to particular instances.

The set of overlay layer data 108A-108N may be data that overlays (e.g., adds to or supersedes) the base instancing layer data 106 and/or a subset of the set of overlay layer data 108. The set of overlay layer data 108A-108N may not necessarily include complete instancing data for an instance, but rather may include customizations to an instance and a reference to the instance being customized. Further explanation may be found in the description of FIG. 7 of the present disclosure. For example, if a color of a particular instance is changed from red to blue, the overlay layer data may include a reference to the particular instance, a reference to the attribute being changed (e.g., "Color"), and the customized value of the attribute (e.g., "blue") without including data about the particular instance that is unchanged (e.g., position, orientation, scale, object source storage location, etc.); in this manner, overlay data may be preserved in compact form. Additionally or alternatively, overlay layer data may include new instances to be added to the instances specified in the base instancing layer data 106. Like the base instancing layer data 106, the data specifying the additional instances may include respective object data sources (e.g., where the object mesh data is stored), scale, their respective positions and/or orientations within the scene, and/or their respective scales within the scene, as well as any customizations to particular new instances.

The set of overlay layer data 108A-108N may include overlay data produced by one or more users or workgroups. For example, the overlay layer data A 108A may have been produced by the Set Dressing workgroup, whereas the overlay layer data N 108N may have been produced by the special effects (FX) workgroup. It is contemplated that the set of overlay layer data 108A-108N may comprise overlay layer data from any number of sources.

The instancing service 104 may be a computer software application executing on a computer system. The instancing service 104 may be configured to render multiple copies of the same computer graphics mesh in a scene as specified according to instancing data provided as input to the instancing service 104.

The main processing component 110 may be the component of the instancing service that receives the instancing data 112 and renders a set of instances in the manner specified by the instancing data. The main processing component 110 may output to a file or to a display of a client device of a user. The main processing component 110 may be implemented in hardware or executed software application, depending on implementation. In an embodiment, the instance broker 102 may be installed as a plug-in to the instancing service to operate as an intermediary between one or more data sources (e.g., the base instancing layer data 106 and the set of overlay layer data 108A-108N) and the instancing service 104.

The main processing component 110 may not be configured to receive multiple sets of instancing layer data (e.g., the base instancing layer data 106 and the set of overlay layer data 108A-108N) or may not be configured to receive partial instancing layer data (e.g., customization data indicating changes from the base instancing layer data 106). In such a case, the instance broker 102 may combine such data into the instancing data 112 to provide to the main processing component 110. The instancing data 112 may include the data sufficient for the main processing component 110 to render the instances specified in and in the manner indicated in the base instancing layer data 106 and the set of overlay layer data 108A-108N. The instance broker 102 may further translate/normalize the instancing layer data it receives into a format usable by the instancing service 104; this provides the advantage that, if a user decides to switch to a different software application for the instancing service, the instance broker 102, as an intermediary between the source data and the instancing service may be configured to automatically translate/normalize the source data into a format usable by the different software application.

By allowing the system to collapse together overlays made by different artists, the instance broker can, for example, reduce the complexity of a dataset by reducing tens of thousands of changes to just hundreds of changes, with little or no loss.

Figure 2:
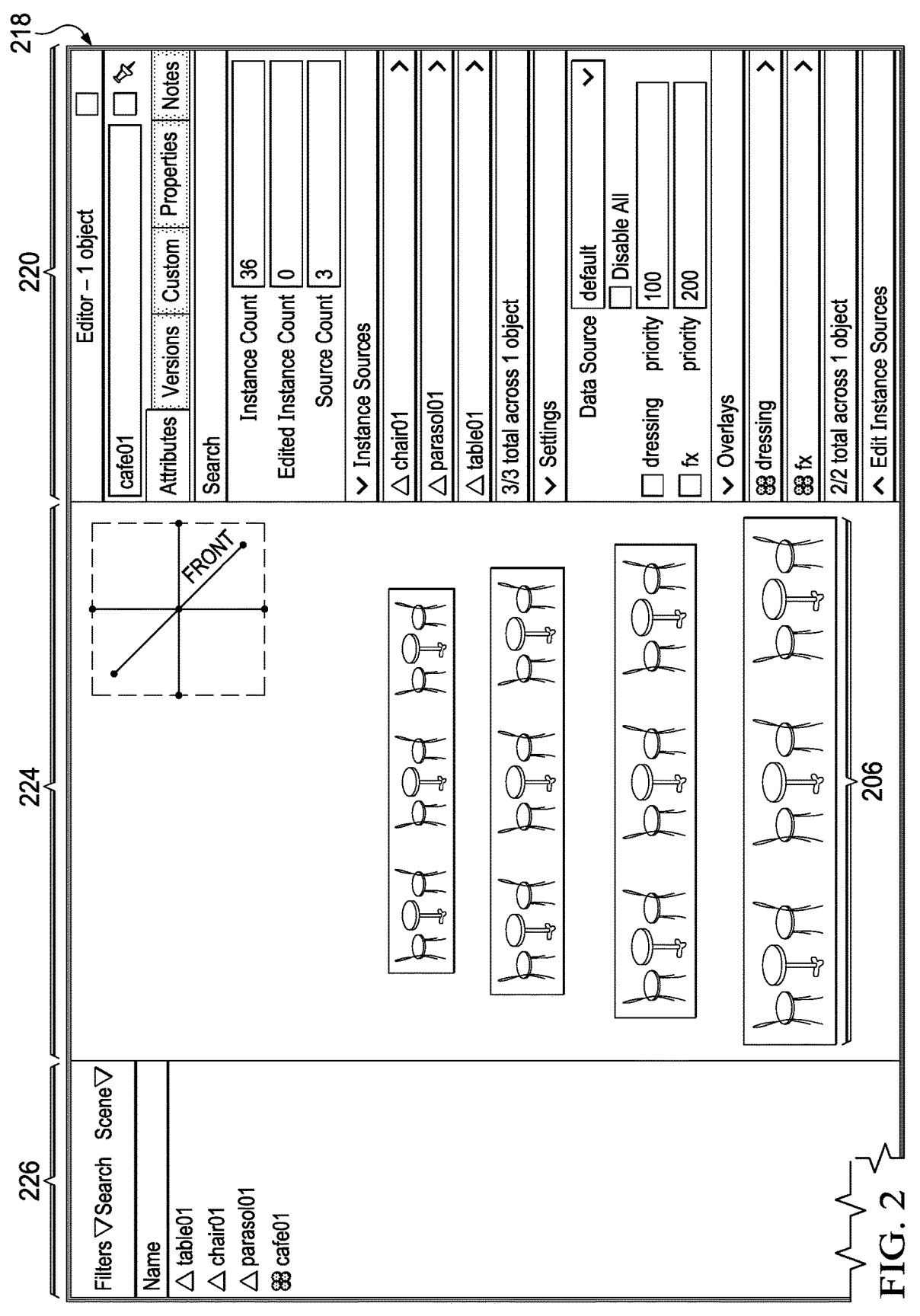

FIG. 2 illustrates an example interface 218 of an embodiment of the present disclosure. Specifically, FIG. 2 depicts an example interface 218 for instancing a scene and editing object instances in the scene. In the example interface 218, an element comprising a table object and two chair objects has been instanced twelve times (four rows of three), totaling 36 object instances 206 in the scene. The object instances 206 may each correspond to a set of data indicating a source object and a placement (e.g., at least one of a position, orientation, scale, or skew) within the scene.

In an embodiment, the example interface or user interface 218 is an interface through which an operator can create, view, manipulate, and remove objects from a scene in a virtual environment. It is contemplated that user interfaces for performing techniques of the present disclosure may be configured in various ways; the example interface 218 presents one example for illustrative purposes and includes an outliner panel 226, a viewport 224, and an editor panel 220.

The editor panel 220 may be a portion of the example interface 218 that displays various attributes of the scene and instanced objects within the scene. One or more of these attributes may be editable, for example, via form field elements within the editor panel. It is contemplated that an actual implementation of an interface usable with the techniques of the present disclosure may vary from the example interface 218, so the editor panel, as well as the viewport 224 and the outliner panel 226 should be considered illustrative only. The layout, functionality, and attributes of the editor panel 220 may vary based on implementation. In the example interface 218, it can be seen that the editor panel 220 includes, for a project, a series of tabs (e.g., "Attributes," and other tabs). The editor panel 220, viewport 224, and outliner panel 226 may for example be operated by a user via a keyboard, mouse, touchscreen, smart stylus, drawing pad, voice command, etc.

The "Attribute" tab is the currently selected view in the editor panel 220 and this view may display the various attributes of the scene depicted in the viewport 224. The "Versions" tab may cause information about the current and previous versions of the scene to be displayed in the editor panel 220. The "Custom" tab may cause information about customized instances to be displayed in the editor panel 220. The "Properties" tab may cause information about the properties of source objects to be displayed in the editor panel 220. The "Notes" tab may allow an artist to enter various comments for their benefit or for another's benefit.

The active "Attribute" view of the editor panel 220 may include expandable submenus. For example, "Instance Sources" can be seen to be a submenu that has been expanded (as indicated by the down-arrow) to list the objects being instanced in the scene (e.g., "chair01," "parasol01," and "table01"). Note that one or more instances of the objects listed (e.g., "parasol01") may be hidden or not necessarily be shown in the viewport 224; for example, some object instances may be associated with a particular overlay, not currently being applied in the viewport 224. As another example, "Settings" can also be seen to be a submenu that has been expanded to display the current data source (e.g., "default"), available selectable overlays (e.g., "dressing" and "fx"), and their corresponding priorities. Likewise, "Overlays" is another example of a submenu that can be seen to have been expanded to show the overlays associated with the currently selected instancing item in the viewport 206. Also, "Edit Instance Sources" is an example of a submenu that is not currently expanded (as indicated by the up-arrow), but were it expanded may enable a user to add, modify, or remove the sources of the object instances 206 (e.g., to remove a table object source and add a barrel object source in its place).

Further, some controls within the editor panel 220 may be provide further navigational functionality; for example, activating the right-arrow next to "chair01," "parasol01," "table01," "dressing," or "fx" in the editor panel 200 may cause that item to be selected (e.g., instead of "cafe01"), which in turn may cause the editor panel 220 to display the state of the selected item. The editor panel 220 may support various types of form control elements, such as textboxes (e.g., "Instance Count," "Edited Instance Count," "Source Count," and "priority"), dropdowns (e.g., "Data Source"), and checkboxes (e.g., "Disable All," "dressing," and "fx"). Checkboxes may be active or inactive; for example, it can be seen in the example interface 218 that neither the "dressing" overlay nor the "fx" overlay are currently active by virtue of their respective checkboxes being unchecked. Other contemplated controls in an implementation include, but are not limited to, radio buttons, select boxes, password boxes, button objects, and so on.

In some embodiments, the "priority" textbox may allow for a user to prioritize overlays. For example, if two or more active overlays have attributes with conflicting values, the overlay with the foremost priority (which, depending on implementation, may be the higher or lower value of the priorities) may take precedent and supersede or overwrite the attributes of the instances shown in the viewport 224. As currently displayed, the "dressing" overlay has a priority of "100" and the "fx" overlay has a priority of "200," indicating that, if there is an attribute conflict, the "fx" overlay will take priority. When overlay attributes conflict between active overlays with the same priority, various methods (depending on implementation) may be used to resolve the conflict. For example, attributes of the last-applied overlay may take precedent over previously applied overlays or the example interface 218 may prompt the user to resolve the conflict.

Some control objects within the editor panel 220 may be for displaying information only and may not be editable. For example, the "Instance Count" textbox informs the user that there are 36 object instances in the currently selected instancing item (e.g., "cafe01"). This value may be automatically calculated by the example interface 218 and may not be directly editable (e.g., but may be automatically recalculated as object instances are added or removed from the scene). As another example, the "Source Count" textbox may indicate the number (e.g., three) of object sources in the scene (e.g., "chair01," "parasol01," and "table01"), and the "Edited Instance Count" textbox may indicate the number of customized instances in the scene (currently there are zero in the example interface 218). Other functionality may include "Search" functionality for searching for various object instances sources, attributes, attribute values, or the like.

The viewport 224 may be a portion of the example interface 218 for providing a visual indication to a user of how the object instances 206 will be rendered. The viewport 224 may be a two-dimensional (2D) perspective view of a three-dimensional (3D) space, the orientation of the perspective view of the 3D space may be indicated by a graphical object in the example interface 218, such as the Euclidean axes in the upper right corner of the viewport 224. Instances displayed in the viewport 224 may be selectable by, for example, causing a cursor to hover over the instance representations in the viewport 224 and interacting with (e.g., by an input device click) the instance representations. Additionally or alternatively, instances may be selected by "drawing a box" around the instances, for example, by clicking and holding an input device control at a position corresponding to a coordinate location in the viewport, moving the input device, and releasing the input device control at another position corresponding to another coordinate location in the viewport, thereby causing object instances within a space bounded by the coordinate locations to be selected. It is contemplated that other methods of selecting the object instances 206 may be used in various implementations.

The outliner panel 226 may be a portion of the example interface 218 for providing information outlining (e.g., in a tree view) a hierarchy of the instance data corresponding to the object instances 206 in the scene. Various filters or ordering may be applied to cause the outliner panel 226 to display relevant information desired by a user. Different icons (e.g., colored dots, triangles, etc.) may indicate different properties of the items displayed in the outliner panel 226. For example, the triangles to the left of "table01," "chair01," and "parasol01" may be a visual indication referring to the item type of the item. As another example, the four dots to the left of "cafe01" may be a visual indication that the item is an instance or a group of instances (e.g., nested). That is, "cafe01" may represent the object instances 206. Of course, other user interface elements could be used to provide this functionality.

Figure 3:
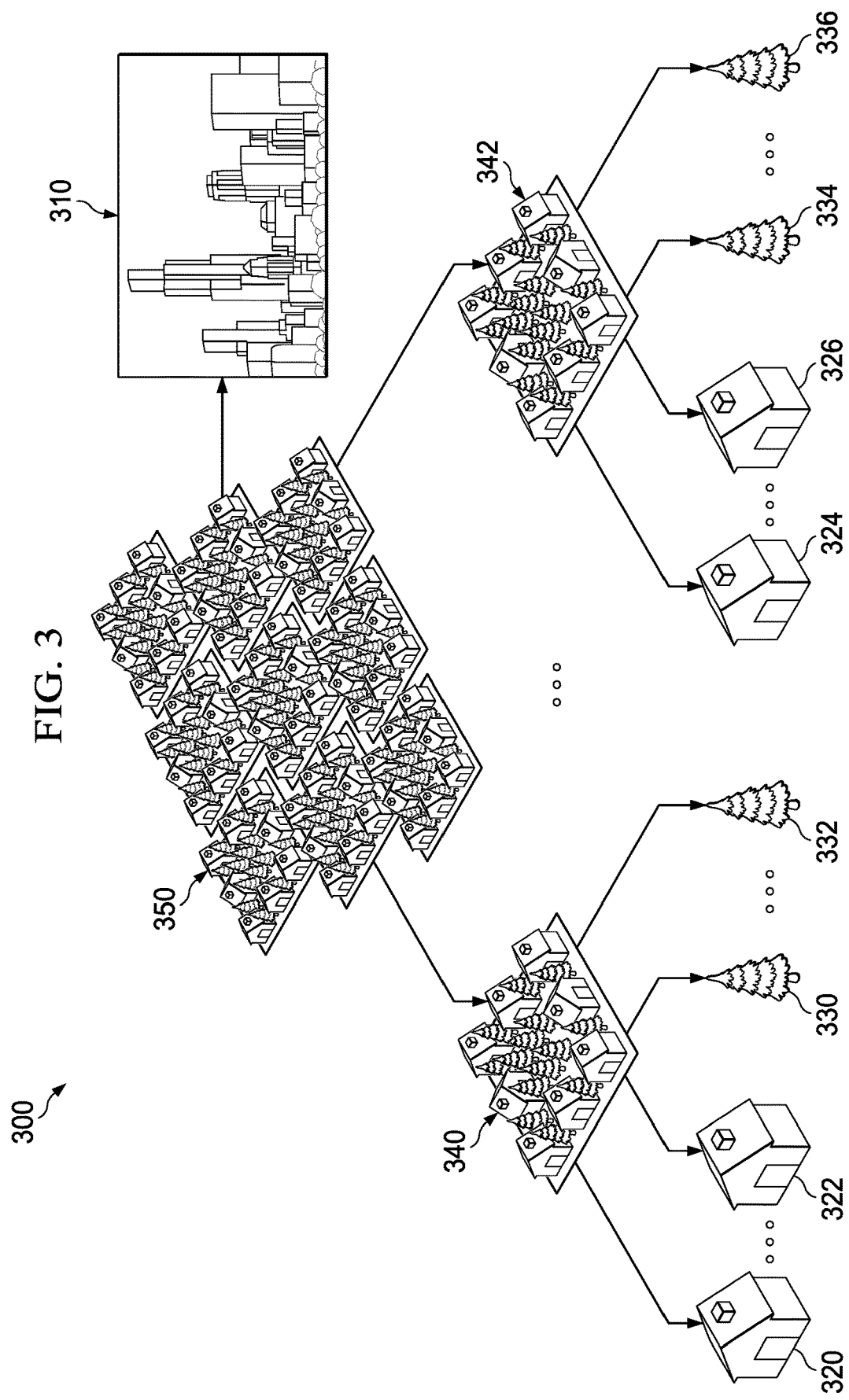
FIG. 3 illustrates an exemplary process or method for designing a scene of a cityscape by assembling multiple instances of houses and trees in accordance with an embodiment.

FIG. 3 illustrates an exemplary process or method 300 for designing a scene of a cityscape 310 by assembling multiple instances of houses 320, 322, 324, 326 and trees 330, 332, 334, 336, in accordance with an embodiment. The houses and trees can be assembled into city blocks 340 and 342. Multiple instances of city blocks 340 and 342 can then be assembled into a neighborhood 350. Multiple neighborhoods can be assembled into a city 310. In an example, an artist can edit one house (e.g., house 320, for example by changing its size or color, or by adding, moving, or deleting an element such as a window or door), and all instances of that house in the city block, neighborhood, and city (e.g., city block 340, neighborhood 350, and city 310) may be changed accordingly. Alternatively, the artist may customize a particular instance of the house within a city block or neighborhood, and the edits may be saved only for that instance, and for hierarchical children of that instance. In some embodiments, an artist can edit the concept of a house (e.g., by changing the basic shape), and the edits will flow into all four house objects 320, 322, 324, and 326.

Figure 4:
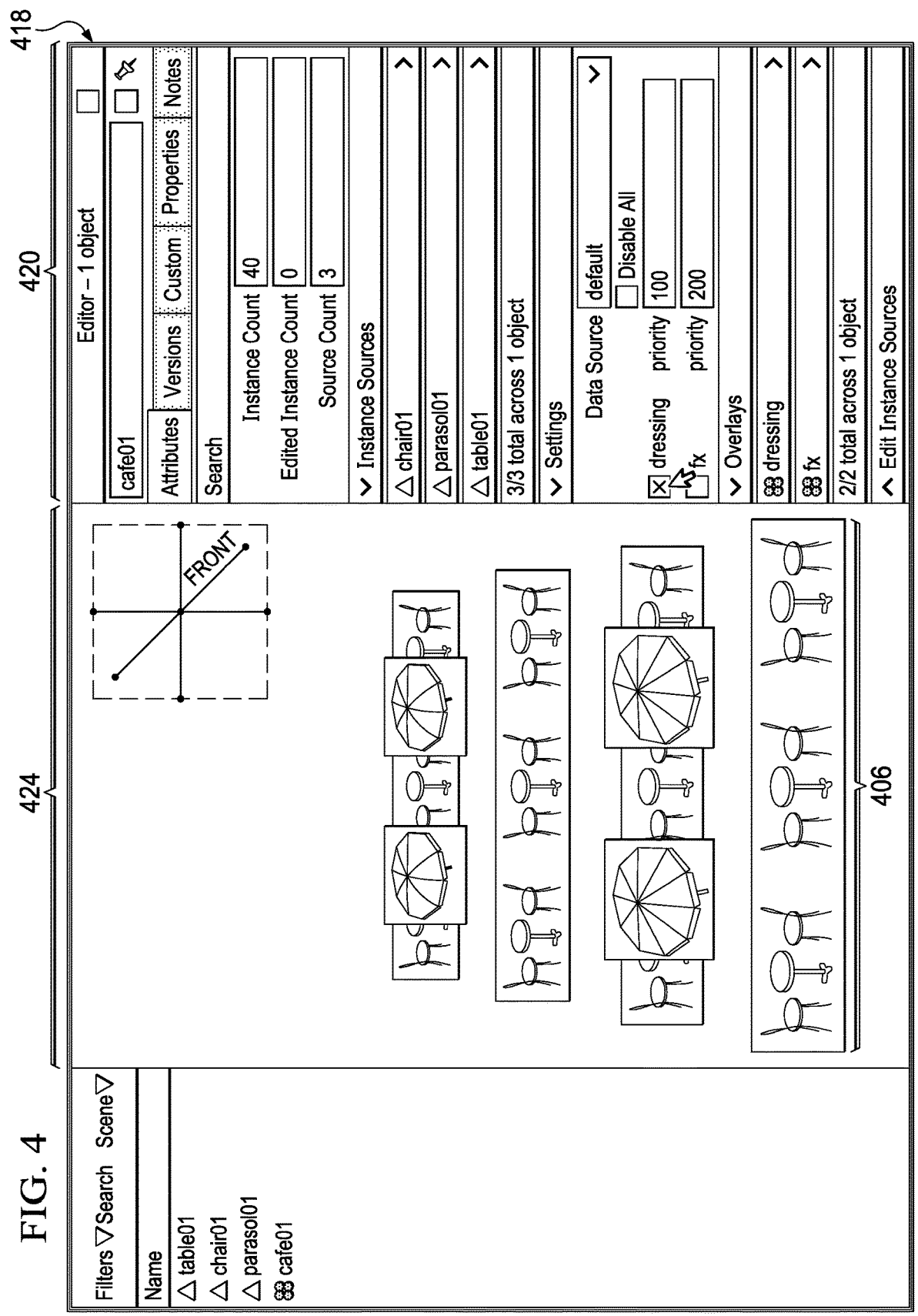
FIG. 4 shows an example of an interface for independently customizing instances in accordance with an embodiment.

FIG. 4 illustrates another aspect of an example interface 418 of an embodiment of the present disclosure. Specifically, FIG. 4 depicts an example interface 418 for instancing a scene and editing object instances in the scene. The example interface 418 depicts the same cafe scene as in FIG. 2, with a set of instances 406 comprising 12 table object instances and 24 chair object instances, except that the scene in FIG. 4 now include 4 parasol object instances, which appear in the viewport 424 due to the "dressing" checkbox in the editor panel 420 being activated by a user controlling a cursor icon (e.g., via an input device, such as a mouse). The viewport 424 and the editor panel 420 may be similar to the viewport 224 and the editor panel 220 of FIG. 2, respectively.

Activating the "dressing" checkbox may cause the instance broker to integrate overlay layer data created by a Set Dressing workgroup into the instancing data. As can be seen in FIG. 2, the parasol object data was previously loaded in the example interface 218 but not shown due to the "dressing" checkbox being unchecked in the editor panel 220. The overlay layer data causing the parasol instances to be displayed may be referred to as "additive" overlay layer data in the present disclosure because it specifies instances to be added to the base instancing layer data. Note also, that with the addition of the parasol object instances, the instance count of the selected "cafe01" instancing object has increased from 36 to 40.

Figure 5:
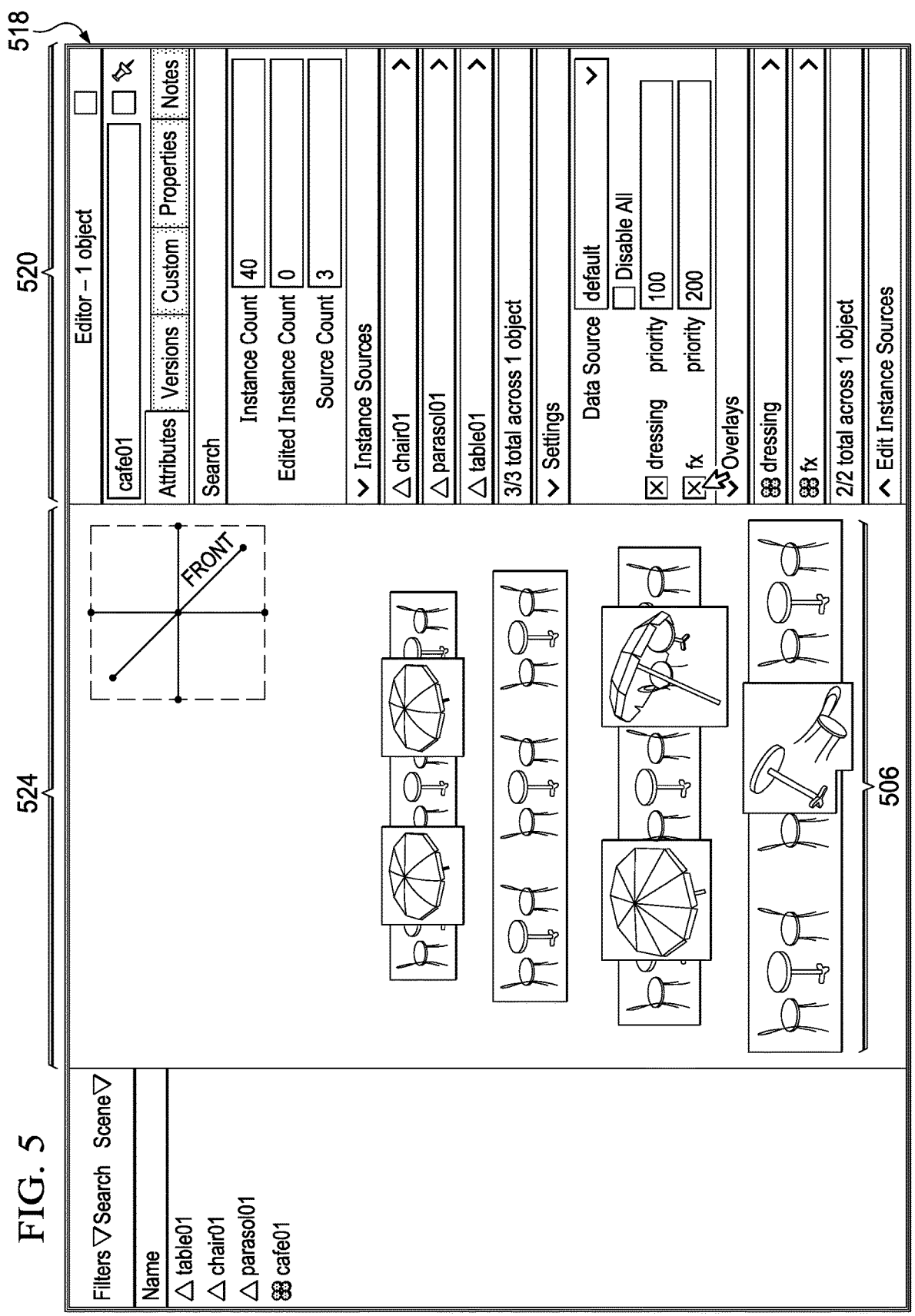
FIG. 5 shows another example of an interface for independently customizing instances in accordance with an embodiment.

FIG. 5 illustrates another aspect of an example interface 518 of an embodiment of the present disclosure. Specifically, FIG. 5 depicts an example interface 518 for instancing a scene and editing object instances in the scene. The example interface 518 depicts the same cafe scene as in FIG. 4, except that three instances (a parasol object instance, a chair object instance, and a table object instance) in the set of instances 506 are shown to be customized (e.g., orientation changed to be knocked over) in the viewport 524 due to the "fx" checkboxes in the editor panel 520 being activated by a user controlling a cursor icon (e.g., via an input device, such as a mouse). The viewport 524 and the editor panel 520 may be similar to the viewport 224 and the editor panel 220 of FIG. 2, respectively.

Activating the "fx" checkbox may cause the instance broker to integrate overlay layer data created by the FX workgroup into the instancing data. Specifically, the FX workgroup has customized the orientations of a chair object instance and a table object instance from the base instancing layer data and the orientation of a parasol object instance from the additive overlay layer data from the Set Dressing workgroup so as to make it appear that these object instances have fallen over or been knocked over.

Benefits of the techniques of the present disclosure include aiding in coordinating complex workflows between different types of groups creating a digital animation scene. For example, the Layout workgroup may have instanced a hundred trees forming a forest scene and then hands further development of the scene to another workgroup, Effects (FX). FX intends to add animation exploding ten of the trees. In embodiments, FX can, via an interface similar to the example interface 418, target ten of the trees (leaving the remaining 90 trees untargeted) and add explosion animation to explode the targeted trees; the untargeted trees remain unchanged. If Layout decides to change the forest (e.g., rotating the forest, adding new trees, changing others, etc.), their changes still apply over without FX having to re-do their animations.

The system of the present disclosure provides a way to take an instance state and apply customizations to individual object instances. Customizations may include, but are not limited to, animations, such as adding motion, changing motion, and other changes, such as different shading or scaling. Thus, when a digital animation artist in one workgroup wants to make a change, the digital animation artist can have a reasonable level of confidence that the digital animation artist's changes can be layered on top of the existing changes.

Figure 6:
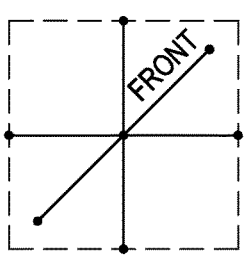
FIG. 6 shows another example of an interface for independently customizing instances in accordance with an embodiment.

FIG. 6 illustrates another aspect of an example interface 618 of an embodiment of the present disclosure. Specifically, FIG. 6 depicts an example interface 618 for instancing a scene and editing object instances in the scene. FIG. 6 depicts a similar scene to FIG. 2, but all of the chair object instances in the set of object instances 606 are seen to have been rotated. FIG. 6 illustrates that the rotation customizations, integrated into the instancing data of FIG. 2, may be saved/published to overwrite or create a new version of the base instancing layer data. Thus, the published customizations become part of the base instancing layer data, as can be seen by noting that neither of the overlay data source checkboxes ("dressing" and "fx") are activated.

Figure 7:
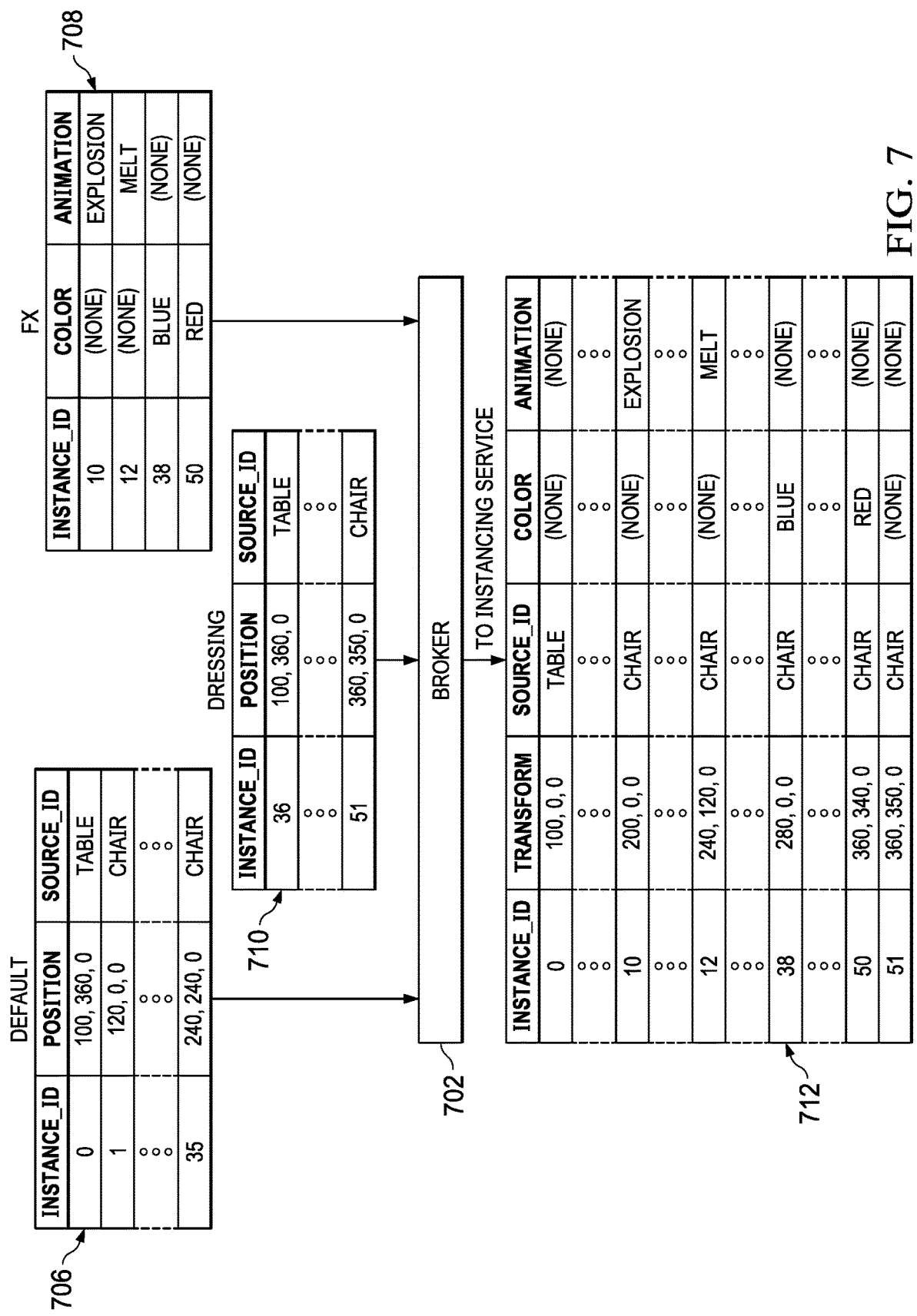
FIG. 7 shows, in bock diagram form, an example of an instance broker combining portions of instancing data in accordance with an embodiment.

FIG. 7 illustrates, in block diagram form, an example of an instance broker 702 of an embodiment of the present disclosure. Specifically, FIG. 7 depicts an instance broker 702 that combines portions of instancing data, such as base instancing layer data 706, additive overlay layer data 710, and regular overlay layer data 708, to produce instancing data 712 to provide to a main processing component, such as the main processing component 110 of FIG. 1, of an instancing service, such as the instancing service 104. The instance broker 702 may be similar to the instance broker 102 of FIG. 1. For example, the instance broker 702 may be an executable plug-in to an instancing application that operates as an intermediary between one or more data sources and the instancing application.

The base instancing layer data 706 may be similar to the base instancing layer data 106 of FIG. 1. For example, the base instancing layer data 706 may include instancing data for one or more instances of objects in a scene. In various implementations, the base instancing layer data 706 may be provided to an instancing service to cause the instancing service to render a scene; however, such a scene may lack customized or additional instances specified in the overlay layer data 708 and 710. In the illustrative example shown in FIG. 7, the base instancing layer data 706 is depicted as having 36 instances of table objects and chair objects (e.g., such as the scene of 12 tables and 24 chairs depicted in FIG. 2). Thus, the table of base instancing layer data 706 may include fields for an instance identifier (to identify the particular instance), a position and/or orientation of the instance within the scene, and source (e.g., source data identifier or source data storage location) of the object to be instanced.

The regular overlay layer data 708 may indicate changes (customizations) made to specific instances (corresponding to the instance identifiers) in the scene in either the base instancing layer data 706 or the additive overlay layer data 710. For example, the table of regular overlay layer data 708 includes a field for the instance identifier (e.g., identifying the instance to which the customization applies) and field for the attribute of the object/instance being customized from its default value (or value in the base instancing layer data 706 or the additive overlay layer data 710). In embodiments, the field for the attribute of the object/instance being customized may be dynamically added after the customization is applied (e.g., via an interface such as the example interface 218 of FIG. 2). In some embodiments, the regular overlay layer data may include some or all of the fields present in the base instancing layer data 706 but the fields may be empty or null if uncustomized (e.g., position field left blank if the instance's position is not changed). In other embodiments, uncustomized fields of the base instancing layer data 706 may be omitted from the regular overlay layer data 708.

In the illustrative example shown in FIG. 7, an instance indicated in the base instancing layer data 706 corresponding to instance identifier 10 has been customized to be affected by an "explosion" animation. Similarly, an instance indicated in the base instancing layer data 706 corresponding to instance identifier 12 has been customized to be affected by a "melt" animation. Likewise, an instance corresponding to instance identifier 38 has had its color changed to "blue." Note that the instance identifier 38 therefore corresponds to an instance indicated in the additive overlay layer data 710, rather than the base instancing layer data 706, which only includes instance identifiers 0 through 36. Similarly, an instance indicated in the additive overlay layer data 710 corresponding to instance identifier 50 has had its color changed to "red."

The additive overlay layer data 710 may be instancing data that adds additional instances to the scene of the base instancing layer data 706. In cases where the additive overlay layer data 710 only adds additional instances, as illustrated in FIG. 7, the fields of the additive overlay layer data 710 may be similar or identical to the fields of the base instancing layer data 706. However, in embodiments, the additive overlay layer data 710 may additionally include customization data (not depicted) of attributes of the added instances and/or instances indicated in other instancing data (e.g., the base instancing layer data 706) or other additive overlay layer data source; in such a case, the additive overlay layer data 710 may include additional fields corresponding to the customized attributes (e.g., similar to "color" and "animation" fields of the regular overlay layer data 708).

The instance broker 702 may combine the portions of instancing data of the base instancing layer data 706, the regular overlay layer data 708, and the additive overlay layer data 710, resolving any conflicting attribute values, and produce the instancing data 712. The instancing data 712 may be similar to the instancing data 112 of FIG. 1. In the illustrative example shown in FIG. 7, the instancing data includes instances 0 through 35 indicated in the base instancing layer data 706, the additional instances 36 through 51 (for a total of 52 instances in the scene), and applies the customizations (e.g., "explosion," "melt," "blue," and "red") to their respective instances. The instance broker 702 may output the instancing data 712 to a file or may provide it directly to an instancing service (e.g., via the main processing component 110 of the instancing service 104 depicted in FIG. 1.

Figure 8:
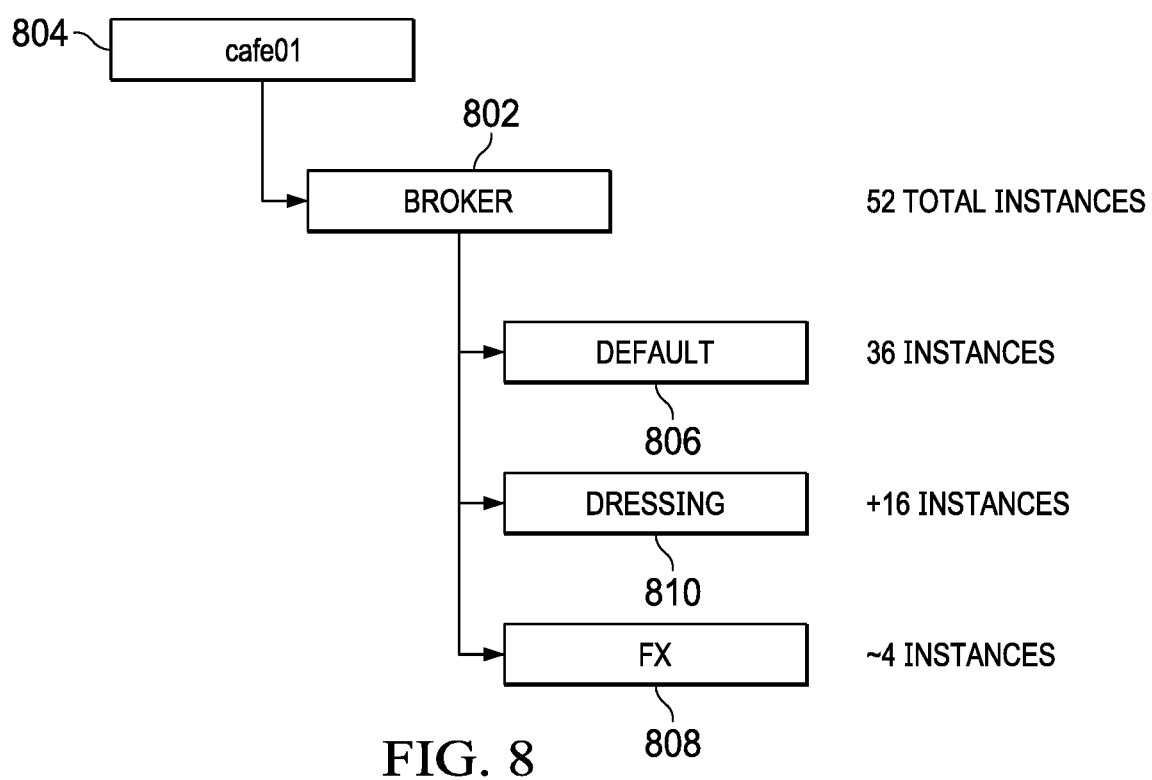
FIG. 8 shows an example of a hierarchy of instancing data in accordance with an embodiment.

FIG. 8 illustrates an example hierarchy of instancing data of an embodiment of the present disclosure. As illustrated in FIG. 8, the data depicted may be data for a scene similar to that depicted in FIG. 2 and represented by the data tables of FIG. 7. In FIG. 8, at the top of the hierarchy, cafe instancing data 804 includes the broker instancing data 802, which in turn has the default instancing data 806 plus overlay layer data 810 ("dressing") plus overlay layer data 808 ("fx") data.

The default instancing data 806 may be similar to the base instancing layer data 706 of FIG. 7. For example, the default instancing data 806 may include data that defines the original layout of the table and chair object instances. The overlay layer data 810 may be similar to the additive overlay layer data 710 of FIG. 7. For example, the overlay layer data 810 may be an additive overlay that adds 16 new instances. The overlay layer data 808 may be similar to the regular overlay layer data 708 of FIG. 7. For example, the overlay layer data 808 may be customization for modifying attributes of four instances.

The broker instancing data 802 therefore combines the default instancing data 806 with the overlay layer data 808 and 810 to comprise a cumulative total of 52 instances (e.g., 36+16). The four (4) instances in the overlay layer data 808 are customizations to existing instances and therefore do not cause additional instances to be created. The cafe instancing data 804 may be the cumulative instancing data as compiled by the instance broker. For example, the cafe instancing data may be similar to the instancing data 712 of FIG. 7.

Figure 9:
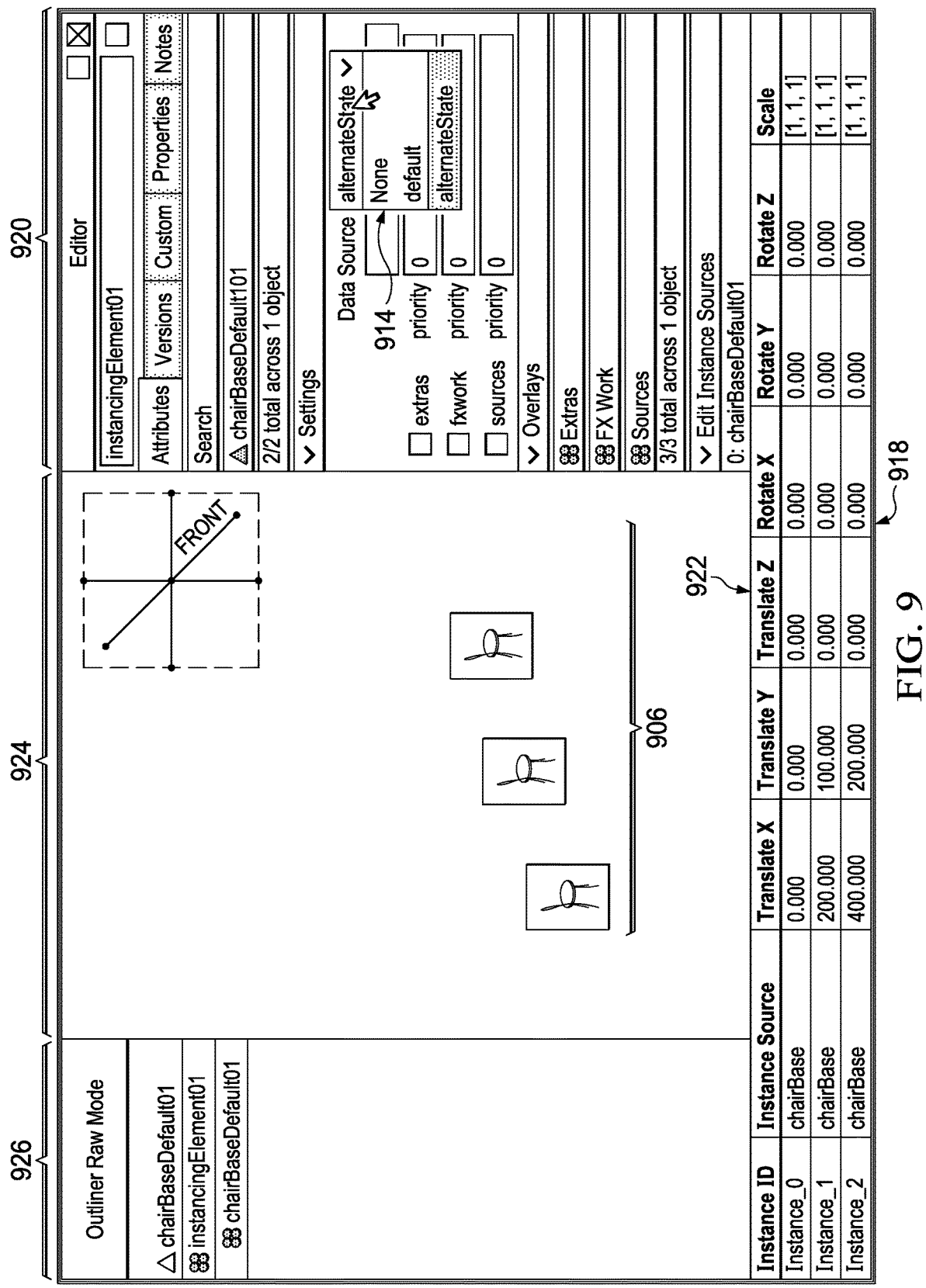
FIG. 9 shows another example of an interface for independently customizing instances in accordance with an embodiment.

FIG. 9 illustrates an example interface or user interface 918 of an embodiment of the present disclosure. Specifically, FIG. 9 depicts an example interface 918 for instancing a scene and editing object instances in the scene. In the example interface 918, three instances of a chair object 906 are depicted. In the illustrative example, the source object is the chair object 906 and the instance state is the three positions of the instances of the chair object 906.

In an embodiment, the example interface 918 is an interface through which an operator can create, view, manipulate, and remove objects from a scene in a virtual environment. It is contemplated that an implementation of an interface usable with the techniques of the present disclosure may vary from that shown in FIG. 9, and the example interface 918 is intended to be illustrative of the functions and features such an interface may include. In an embodiment, the three instances of the chair object 906 are object instances instantiated from a source object in different positions in the scene. Other than position, the other characteristics of the three instances of the chair may be inherited from the master chair object. In FIG. 9, the source data structure ("instancingElement01") of the chair 906 is selected in the outliner panel 926.

As depicted in FIG. 9, the source data structure includes a set of characteristics ("Sources," "FX Work," "Extras," "DefaultinstanceStateProvider," and "AlternateInstanceStateProvider"), which themselves may have sub-characteristics.

In embodiments, a data table 922 includes information corresponding to the instances displayed in the scene depicted in the viewport 924. For example, the data table 922 includes, for each instance, a column storing a unique identifier of the instance, a source object for the instance, X, Y, and Z coordinates of the instance, X, Y, and Z rotations of the instance, and scale of the instance. In the example interface 918, "Instance_0," "Instance_1," and "Instance_2" are instances of the chair object and have a source of "chairBase." The outliner panel 926, viewport 924, and the editor panel 920 may be similar to the outliner panel 226, the viewport 224, and the editor panel 220 of FIG. 2, respectively.

In the example interface 918, a settings submenu of the editor panel 920 has been expanded to illustrate how the example interface 918 allows the operator to toggle the instance state data source 914 (e.g., changing Data Source from "default" to "alternateState"). In this manner, a digital animation artist could be creating some objects (e.g., trees) around the place, and the digital animation artist can select to temporarily load a different base instancing layer data source (e.g., with reduced resolution or located on a local cache) to make the scene faster to load and render during times when the scene is not needed to be at the full resolution of the "default" base instancing layer data source. Customizations made by the operator, because they are stored in a separate data structure (e.g., see FIG. 7), can therefore be applied interchangeably by the instance broker to whichever base instancing layer data source is active. For example, for ease of editing, a customization may be applied to an instance in the "alternateState" data, and, upon switching the data source to "default," the customization will be automatically applied to the corresponding instance in the "default" data (e.g., provided that the corresponding instances have matching identifiers). In this manner, editing can be made faster and more usable for the digital animation artist.

Benefits of the techniques of the present disclosure include aiding in coordinating complex workflows between different types of groups creating a digital animation scene. For example, the Layout workgroup may have instanced a hundred tree objects (not depicted) forming a forest scene and then hand further development of the scene to the FX workgroup. FX intends to customize ten of the tree instances by adding animation to cause ten of the tree instances to explode. In embodiments, FX can, via an interface similar to the example interface 918, target ten of the tree instances (leaving the remaining 90 tree instances unselected), and add explosion animation to explode the tree instances. If Layout decides to change the forest (e.g., rotating the forest, adding new tree instances, changing others, etc.), their changes can still apply without FX having to re-do their animations because FX's customizations (adding the animation) are preserved in an overlay data structure that is linked to Layout's instances but stored in a separate structure (similar to the regular overlay layer data 708 of FIG. 7). In this manner, if Layout changes instances, FX's customizations will still apply to their respective instances (e.g., even if the respective instances have been moved or otherwise modified). The instance broker of the present disclosure may combine the base instancing layer data with overlay layer data to create instancing data that may be provided to an instancing service application.

The system of the present disclosure provides a way to take an instance state and apply customizations to individual object instances. Customizations include, but are not limited to animations, such as adding motion, changing motion, and other changes, such as different shading or scaling. Thus, when a digital animation artist in one workgroup wants to make a change, the digital animation artist can have a reasonable level of confidence that the digital animation artist's changes can be layered on top of the existing changes.

Figure 10:
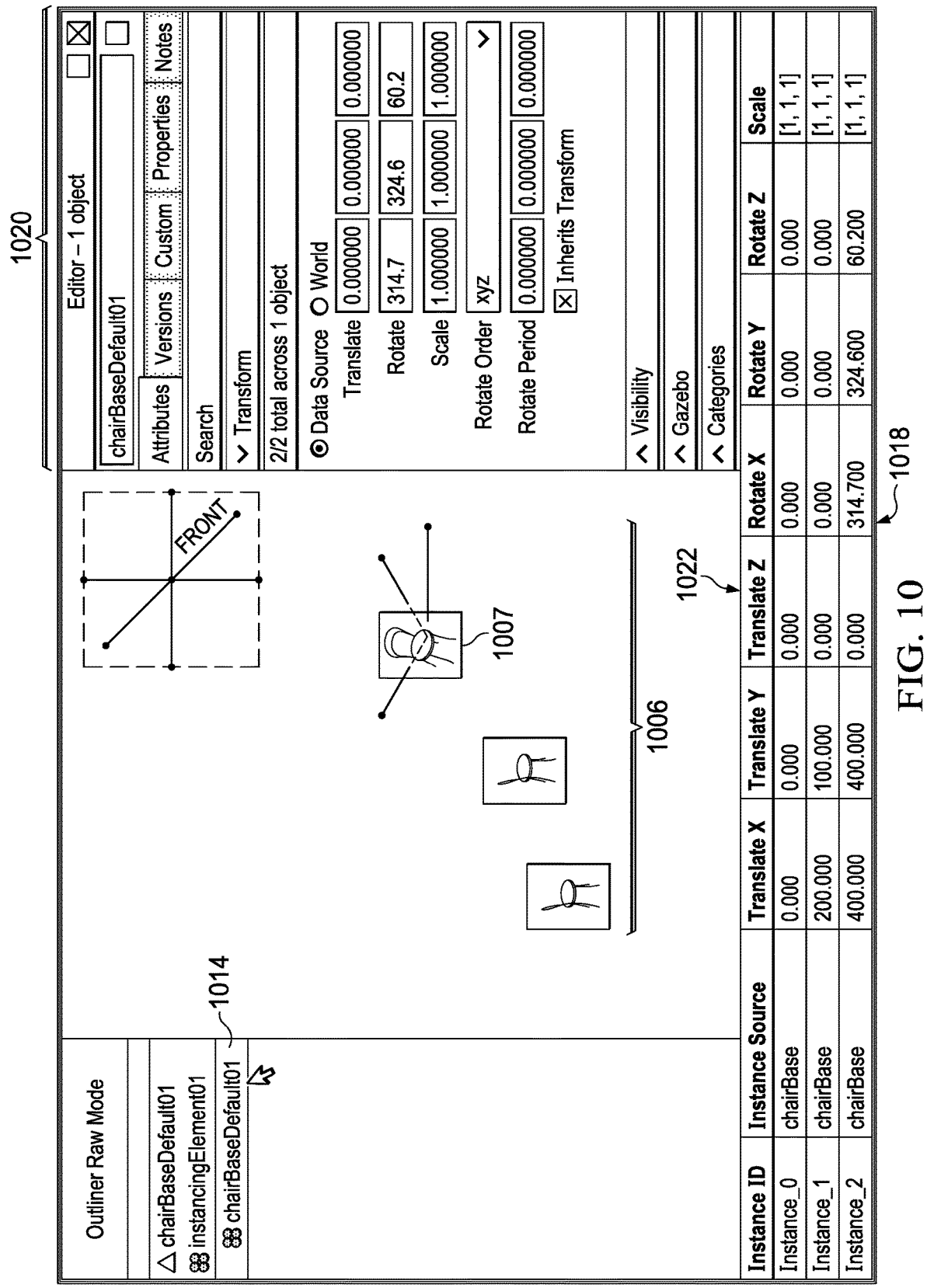
FIG. 10 shows another example of an interface for independently customizing instances in accordance with an embodiment.

FIG. 10 illustrates another aspect of an example interface 1018 of an embodiment of the present disclosure. Specifically, FIG. 10 depicts an example interface 1018 for instancing a scene and editing object instances in the scene. As with the instances of the chair object 906 of FIG. 9, the example interface 1018 illustrates similar instances of a chair object 1006.

The example interface 1018 illustrates how the instance broker of the present disclosure maintains local edits to instances maintained when the user toggles between data sources. As seen in FIG. 10, the transform submenu has been expanded in the editor panel 1020. The editor panel 1020 may be similar to the editor panel 220 of FIG. 2.

In the editor panel 1020, the "chairBaseDefault01" object instance has been selected 1014. In the example interface 1018, an operator may make changes to an instance, for example such as moving and changing an orientation of a specific instance 1007 (Instance 2) of the chair object 1006, as reflected in the transform 1022. These customized attributes (position and orientation) may be stored locally (e.g., in memory or persistent storage of the client device executing the example interface 1018). In this manner, edits to a specific instance can be locally preserved at that state. The instance broker may apply the customized attributes to the base instancing layer data to create instancing data to provide to an instancing service (e.g., the instancing service 104 of FIG. 1) to render the instances with the customizations. It is contemplated that an implementation of interfaces usable with the techniques of the present disclosure may vary from those shown in FIGS. 2 and 4-10, and the example interfaces 218, 418, 518, 618, 818, 918, and 1018 are intended to be illustrative of the functions and features such interfaces may include.

Figure 11:
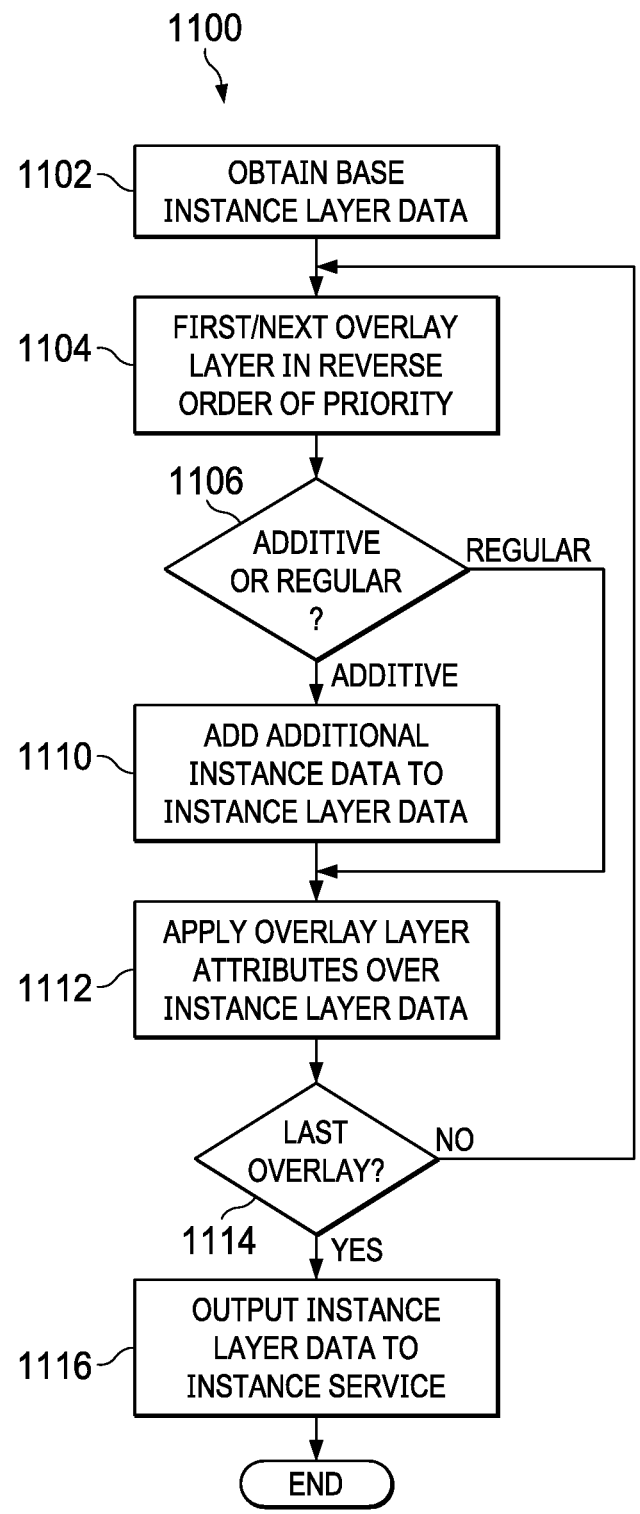
FIG. 11 is a flowchart that shows a process for consolidating instancing data from multiple sources in accordance with an embodiment.

FIG. 11 is a flowchart illustrating an example of a process 1100 for combining portions of instancing data from multiple sources into instancing data. Some or all of the process 1100 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media) or carried on a transmission medium.

Figure 13:
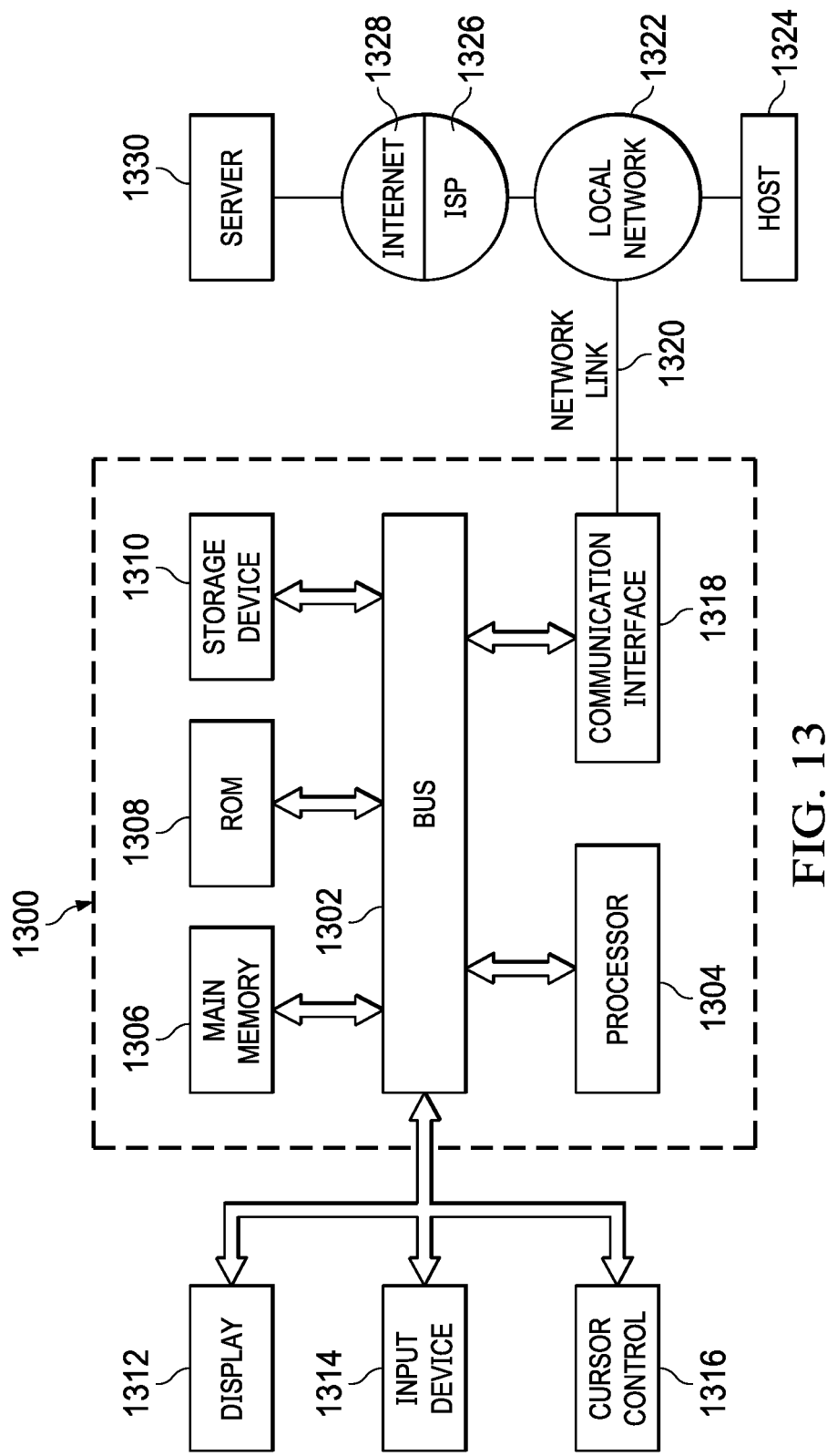
FIG. 13 illustrates a computing device that may be used in accordance with at least one embodiment/an environment in which various embodiments can be implemented.

For example, some or all of process 1100 may be performed by any suitable system, such as a server in a data center, by various components of the environment described in conjunction with FIG. 13, by multiple computing devices in a distributed system of a computing resource service provider, or by any electronic device such as the computer system 1300. The process 1100 includes a series of operations wherein an instance broker obtains base instance layer data and, in reverse priority, adds new instances and applies overlay layer attribute values for each overlay. The resulting instancing data may be output to an instancing service. Depending on the implementation, at least some operations of the method or process may be performed as sequential steps, or may be performed concurrently by applications, services, routines, or agents, or any combination thereof.

In step 1102, the system performing the process 1100 may obtain base instancing layer data. The base instancing layer data may be similar to the base instancing layer data 116 of FIG. 1. For example, the base instancing layer data may be data stored in a file that sets up a digital animation scene. The base instancing layer data may include names or storage locations of object sources, positions and/or orientations of instances of the objects within the scene, scales/sizes of the object instances in the scene, and identifiers for the instances. The base instancing layer data may also be referred to as default data for the instance and forms the initial state of the instancing layer data of the process 1100.

In step 1104, the system performing the process 1100 may sort a set of overlay layer data by reverse order of priority to apply the overlay data. By iterating in reverse order, the overlay layers having higher priority may be applied last, thereby overwriting/superseding any conflicting attribute value of lower priority. Note that priority may be explicitly specified (e.g., see "priority" textbox depicted in FIG. 4), or may be determined from other factors. For example, most recently created or modified overlay data may be given priority over older overlay layer data. As another example, different workflow groups may have priority over other workflow groups; e.g., changes made by the FX workgroup may take priority over changes made by the Set Dressing workgroup. It is contemplated that assigning priority may be performed in other ways not specifically recited in the present disclosure.

In step 1106, the system performing the process 1100 may determine whether the overlay layer data is additive overlay layer data or regular overlay layer data. In embodiments, "additive" overlay layer data includes data that indicates new instances are to be created in addition to the current instances in the instance layer data. Such additive overlay layer data may include fields for the positions and/or orientations, scales, and source data for the objects to be additionally instanced. In embodiments, "regular" overlay layer data may refer to data that customizes attributes of individual instances indicated in the instancing data. If the overlay layer data is regular overlay layer data, the system may proceed to 1112 to apply overlay layer attributes, otherwise the system may proceed to 1110.

In step 1110, the system performing the process 1100 may add the additional instances, as well as any attribute values of the additional instances to the instancing layer data. For example, in FIG. 7, the additive overlay layer data instances 36-51 are added to the base instancing layer data 706 instances 0-35 to result in the instancing data 712 instances 0-51.

In step 1112, the system performing the process 1100 may apply any customized attribute values from the overlay instance data (either additive or regular) to the instancing data. In some implementations, this may be accomplished by overwriting a current value in an attribute field with a customized value. In some embodiments, if a lower priority overlay attempts to change an instance only introduced by a higher level overlay, the lower priority overlay's instance change may be ignored for that particular instance.

In step 1114, the system performing the process 1100 may determine whether there is further overlay layer data to be processed. If so, the system may return to 1104 to process the next overlay layer in the reverse priority order. Otherwise, the system may proceed to 1116 to output the instancing data.

In step 1116, the system performing the process 1100 may output the instancing data. In embodiments, the instancing data may be output directly to an instancing service, such as to the main processing component 110 of the instancing service 104 of FIG. 1. In other implementations, the instancing data may be stored in a file at a storage location. The instancing data may be similar to the instancing data 712 of FIG. 7; that is, the instancing data may include indications of the instances from the base layer instancing data, all new instances indicated in the additive overlay layer data, and the foremost priority customizations from the regular and/or additive overlay layer data. After the instancing data is output, the process 1100 may come to an end. Note that one or more of the operations performed in steps 1102-1116 may be performed in various orders and combinations, including in parallel. For example, in some implementations, adding new instances indicated in the additive overlay layer data may be performed prior to applying customizations. That is, in some cases a customization with lesser priority may indicate to customize an instance that is added in accordance with an additive overlay layer of higher priority; in this manner, if a lower priority overlay attempts to change an instance introduced by a higher level overlay, the instance will have been added to the instance layer data when the iteration reaches the lower priority overlay.

In some implementations, one manner of solving this issue is to add new instances before applying customizations. In other implementations, a solution is to—if a customization refers to an instance that is not yet added to the instancing data—add the instance based on the regular overlay layer data, with empty fields except for the customizations and the instance identifiers, and then complete the empty fields when the additive overlay layer data that indicates to create the instance is processed. For fields which are supplied by both lower and higher priority overlays, the higher priority overlay may take precedence. It is also contemplated that, in some implementations, instance identifiers in additive overlay layer data may not be generated or may be temporary identifiers (the instance identifiers for the new instances may be generated during the process 1100; e.g., between steps 1106 and 1110). Additionally or alternatively, in some implementations instance identifiers for new instances generated in additive overlay layer data may be generated to indicate the layer in which they were added; for example, "dressing 001, dressing 002," "default 001," etc.).

In still other implementations, the process 1100 may be performed in order of priority or in no particular order, rather than reverse order of priority, and in such a case the system may determine whether to customize an attribute based on whether any overlay layers of higher priority have already customized the attribute.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

Figure 12:
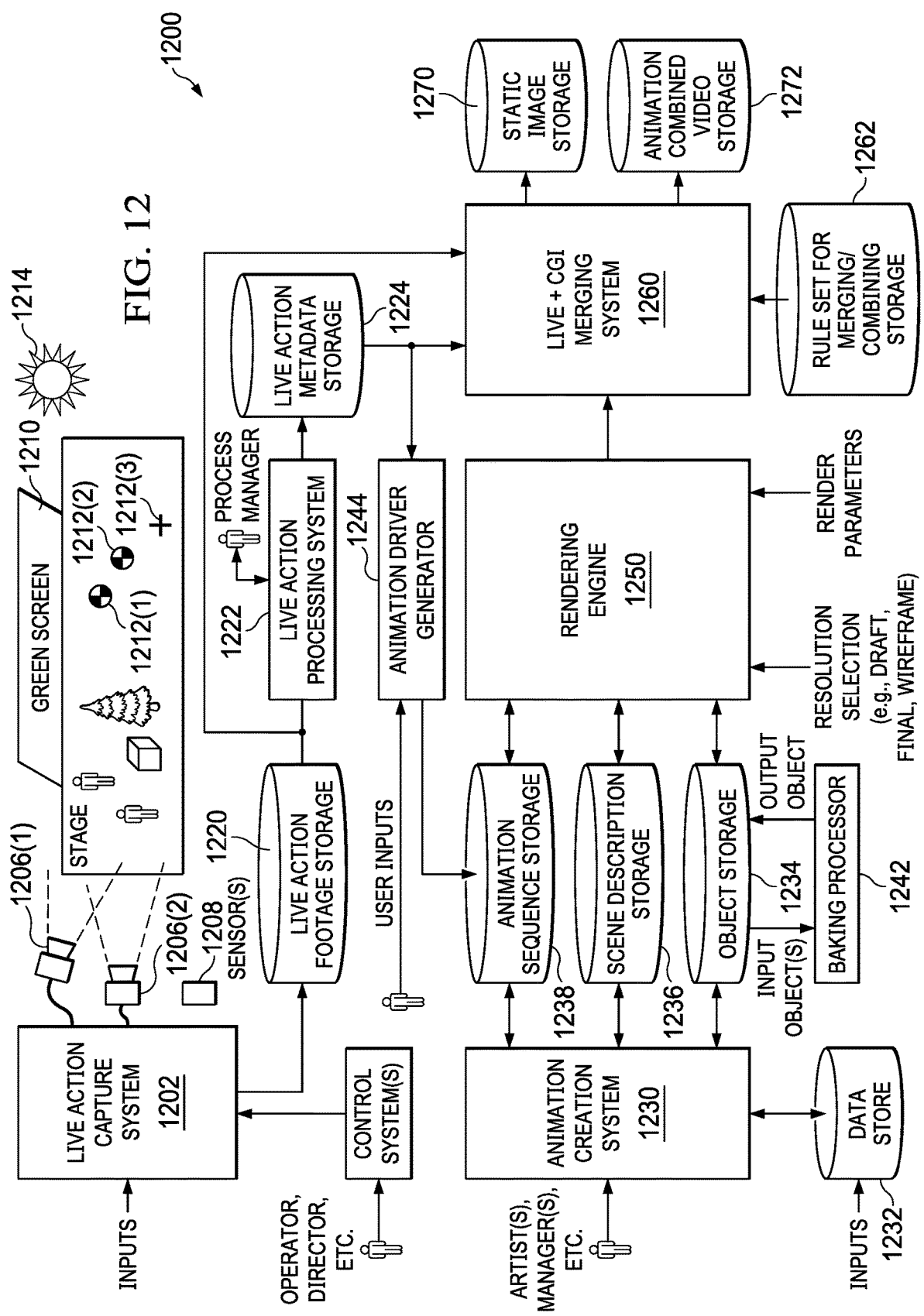
FIG. 12 illustrates an example of visual content generation system as might be used to generate imagery in the form of still images and/or video sequences of images.

FIG. 12 illustrates an example of visual content generation system 1200 as might be used to generate imagery in the form of still images and/or video sequences of images. Visual content generation system 1200 might generate imagery of live action scenes, computer generated scenes, or a combination thereof. In a practical system, users are provided with tools that allow them to specify, at high levels and low levels where necessary, what is to go into that imagery. For example, a user might be an animation artist and might use the visual content generation system 1200 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 1200 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value in (RGB format). Dimension of such two-dimensional array of pixel color values might correspond to a preferred and/or standard display scheme, such as 1920 pixel columns by 1280 pixel rows. Images might or might not be stored in compressed format, but either way, they can represent a desired image by being a two-dimensional array of pixel color values. In another variation, images are represented by a pair of stereo images for three-dimensional presentations and in other variations, some or all of an image output might represent three-dimensional imagery instead of just two-dimensional views.

A stored video sequence might comprise a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might comprise 24 frames per second (24 FPS), 50 FPS, 60 FPS or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects.

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects, lighting, a camera viewpoint, and a camera view plane. From that, a rendering engine could take all of that as inputs and compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 12, a live action capture system 1202 captures a live scene that plays out on a stage 1204. Live action capture system 1202 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1206(1) and 1206(2) capture the scene, while in some systems, there might be other sensor(s) 1208 to capture information from the live scene (e.g., infrared cameras, infrared sensors, motion capture ("mo-cap" detectors, etc.). On stage 1204, there might be human actors, animal actors, inanimate objects, background objects, and possibly an object such as a green screen 1210 that is designed to be captured in a live scene recording in such a way that it is easily overlaid with computer-generated imagery. Stage 1204 might also contain objects that serve as fiducials, such as fiducials 1212(1)-(3), that might be used post-capture to determine where an object was during capture. A live action scene might be illuminated by one or more lights, such as overhead light 1214.

During or following the capture of a live action scene, live action capture system 1202 might output live action footage to live action footage storage 1220. A live action processing system 1222 might process live action footage to generate data about that live action footage and store that data into a live action metadata storage 1224. Live action processing system 1222 might include computer processing capabilities, image processing capabilities, one or more processors, program code storage for storing program instructions executable by the one or more processors, as well as user input devices and user output devices, not all of which are shown. Live action processing system 1222 might process live action footage to determine boundaries of objects in a frame or multiple frames, determine locations of objects in a live action scene, where a camera was relative to some action, distances between moving objects and fiducials, etc. Where elements are sensored or detected, the metadata might include location, color, and intensity of overhead light 1214, as that might be useful in post-processing to match computer-generated lighting on objects that are computer-generated and overlaid on the live action footage.

Live action processing system 1222 might operate autonomously, perhaps based on predetermined program instructions, to generate and output the live action metadata upon receiving and inputting the live action footage. The live action footage can be camera-captured data as well as data from other sensors.

An animation creation system 1230 is another part of visual content generation system 1200. Animation creation system 1230 might include computer processing capabilities, image processing capabilities, one or more processors, program code storage for storing program instructions executable by the one or more processors, as well as user input devices and user output devices, not all of which are shown. Animation creation system 1230 might be used by animation artists, managers, and others to specify details, perhaps programmatically and/or interactively, of imagery to be generated. From user input and data from a database or other data source, indicated as data store 1232, animation creation system 1230 might generate and output data representing objects (e.g., a horse, a human, a ball, a teapot, a cloud, a light source, a texture, etc.) to an object storage 1234, generate and output data representing a scene into a scene description storage 1236, and/or generate and output data representing animation sequences to an animation sequence storage 1238.

Scene data might indicate locations of objects and other visual elements, values of their parameters, lighting, camera location, camera view plane and other details that a rendering engine 1250 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 1230 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to object storage 1234 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from data store 1232 might be used to drive object presentation. For example, if an artist is creating an animation of a spaceship passing over the surface of the Earth, instead of manually drawing or specifying a coastline, the artist might specify that the animation creation system 1230 is to read data from data store 1232 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1244 might read in live action metadata, such as data representing movements and positions of body parts of a live actor during a live action scene, and generate corresponding animation parameters to be stored in animation sequence storage 1238 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 1222. Animation driver generator 1244 might convert that movement data into specifications of how joints of an articulated CGI character are to move over time.

Rendering engine 1250 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important than speed for a movie maker to generate data that will be used for final prints of feature films to be distributed. Rendering engine 1250 might include computer processing capabilities, image processing capabilities, one or more processors, program code storage for storing program instructions executable by the one or more processors, as well as user input devices and user output devices, not all of which are shown.

Visual content generation system 1200 can also include a merging system 1260 that merges live footage with animated content. The live footage might be obtained and input by reading from live action footage storage 1220 to obtain live action footage, by reading from live action metadata storage 1224 to obtain details such as presumed segmentation in captured images segmenting objects in a live action scene from their background (perhaps aided by the fact that green screen 1210 was part of the live action scene), and by obtaining CGI imagery from rendering engine 1250.

Merging system 1260 might also read data from a ruleset for merging/combining storage 1262. A very simple example of a rule in a ruleset might be "obtain a full image comprising a two-dimensional pixel array from live footage, obtain a full image comprising a two-dimensional pixel array from rendering engine 1250 and output an image where each pixel is a corresponding pixel from rendering engine 1250 when the corresponding pixel in the live footage is a specific color of green, otherwise output a pixel value from the corresponding pixel in the live footage".

Merging system 1260 might include computer processing capabilities, image processing capabilities, one or more processors, program code storage for storing program instructions executable by the one or more processors, as well as user input devices and user output devices, not all of which are shown. Merging system 1260 might operate autonomously, following programming instructions, or might have a user interface or programmatic interface over which an operator can control a merging process. In some embodiments, an operator can specify parameter values to use in a merging process and/or might specify specific tweaks to be made to an output of merging system 1260, such as modifying boundaries of segmented objects, inserting blurs to smooth out imperfections, or adding other effects. Based on its inputs, merging system 1260 can output an image to be stored in static image storage 1270 and/or a sequence of images in the form of video to be stored in animated/combined video storage 1272.

Thus, as described, visual content generation system 1200 can be used to generate video that combines live action with computer-generated animation using various components and tools, some of which are described in more detail herein. While visual content generation system 1200 might be useful for such combinations, with suitable settings, it can be used for outputting entirely live action footage or entirely CGI sequences.

Using techniques described herein, a visual content generation system with a user interface that allows artists and others to specific details of scenes might provide for processing elements as instances and via a broker. Logically, this might be the user providing inputs that the visual content generation system stores as a base layer, one or more overlay layers, and other inputs to generate and output a visual result. A broker might manage a first set of instance layer data that describes a scene to be represented by one or more computer-generated images. The set of instance layer data might specify a plurality of object instances within the scene, with each instance of the plurality of object instances possibly corresponding to a position that an instance of a digital object is to appear in the scene. The set of instance layer data can further specify a first set of characteristics of the plurality of object instances that includes the position. A second set of instance layer data may indicate changes to be made to the scene described by the first set of instance layer data, perhaps based on user input. A third set of instance layer data might be generated to include the changes to the scene by overlaying the second set of instance layer data onto the first set of instance layer data.

Generating the output for the scene, such as by rendering, might be done by processing the third set of instance layer data using an instancing service. More generally, the first set of characteristics might include other foundational set of instance state data beyond just position data. Such foundational set of instance state data might include object identifiers (thus providing addressability) and instance source indicators.

The broker can store this data sparsely and in a form that allows for easy modification, creation, and/or extension. Overlays can be used to change attributes of existing instances, to add new attributes to instances in a sparse manner, for example, or to create entirely new instances. The broker might support an arbitrary number of overlays (perhaps only limited by memory and usability). The broker can provide a dynamic composition of the base state and various overlays, and have that data available on-demand to be requested by an instancing service, or queried by editors, spreadsheets, etc.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

For example, FIG. 13 is a block diagram that illustrates a computer system 1300 upon which an embodiment of the invention may be implemented. Computer system 1300 includes a bus 1302 or other communication mechanism for communicating information, and a processor 1304 coupled with bus 1302 for processing information. Processor 1304 may be, for example, a general-purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a computer monitor, for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs the computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from, but may be used in conjunction with, transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a network connection. A modem or network interface local to computer system 1300 can receive the data. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media. Storage media and transmission media are examples of computer readable media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318. The received code may be executed by processor 1304 as it is received, and/or stored in storage device 1310, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
 (a) obtaining a first set of instance layer data that describes a scene to be represented by one or more computer-generated images, the first set of instance layer data specifying:
  (1) a plurality of object instances within the scene, each instance of the plurality of object instances corresponding to a placement that an instance of a digital object is to appear in the scene; and
  (2) a first set of characteristics of the plurality of object instances that includes the placement;

(b) obtaining a second set of instance layer data that indicates changes to be made to the scene described by the first set of instance layer data;

(c) generating a third set of instance layer data that includes the changes to the scene by overlaying the second set of instance layer data onto the first set of instance layer data;

(d) causing the scene to be rendered by providing the third set of instance layer data to an instancing service;

(e) obtaining a fourth set of instance layer data that indicates changes to be made to the scene described by the first set of instance layer data; and (f) generating a fifth set of instance layer data that includes the changes to the scene by overlaying the fourth set of instance layer data onto the first and second sets of instance layer data.

2. The computer-implemented method of claim 1, wherein the changes to the scene include adding an additional instance to the plurality of object instances.

3. The computer-implemented method of claim 2, wherein generating the third set of instance layer data includes, as a result of determining that the second set of instance layer data is additive, adding the second set of instance data to the third set of instance layer data.

4. The computer-implemented method of claim 3, wherein the changes to the scene include a customization to a characteristic of the first set of characteristics.

5. The computer-implemented method of claim 4, wherein generating the third set of instance layer data includes, as a result of determining that the second set of instance layer data includes the customization, applying the customization to the characteristic of the first set of characteristics.

6. The computer-implemented method of claim 4, wherein the customization includes changes to an object instance comprising changes to at least one of a position, an orientation, a size, a scale, a dimension, a color, a texture, a shading, a direction of motion, a reflectiveness, a transparency, an animation sequence, a note, or an object data source.

7. The computer-implemented method of claim 4, wherein the customization includes adding or removing an object instance.

8. The computer-implemented method of claim 4, wherein the customization includes or adding or removing an attribute from an object instance.

9. The computer-implemented method of claim 1, wherein generating the fifth set of instance layer data includes, as a result of determining that the fourth set of instance layer data is additive, adding the additional instance data to the third set of instance layer data.

10. The computer-implemented method of claim 9, wherein, as a result of determining that the fourth set of instance layer data includes a conflict with the second set of instance layer data, resolving the conflict.

11. The computer-implemented method of claim 10, wherein resolving the conflict includes comparing a priority of the fourth set of instance layer data with a priority of the second set of instance layer data.

12. The computer-implemented method of claim 10, wherein resolving the conflict includes comparing a modification time of the fourth set of instance layer data with a modification time of the second set of instance layer data.

13. The computer-implemented method of claim 10, wherein resolving the conflict includes prompting a user.

14. The computer-implemented method of claim 1, wherein generating the fifth set of instance layer data includes, as a result of determining that the fourth set of instance layer data is not additive, determining whether the fourth set of instance layer data conflicts with the second set of instance layer data.

15. The computer-implemented method of claim 1, further comprising translating at least some of the sets of instance layer data into a format usable by a software application.

16. The computer-implemented method of claim 1, further comprising, with a user interface, receiving instructions from a user regarding the plurality of object instances, the first set of characteristics, or the changes.

17. A computer-implemented method, comprising: under the control of one or more computer systems configured with executable instructions:

(a) obtaining a first set of instance layer data that describes a scene to be represented by one or more computer-generated images, the first set of instance layer data specifying:

(1) a plurality of object instances within the scene, each instance of the plurality of object instances corresponding to a placement that an instance of a digital object is to appear in the scene; and (2) a first set of characteristics of the plurality of object instances that includes the placement;

(b) obtaining a second set of instance layer data that indicates changes to be made to the scene described by the first set of instance layer data and, for each change, whether the change applies to an edited instance and children of the edited instance, or to all instances of the digital object;

(c) generating a third set of instance layer data that includes the changes to the scene by overlaying the second set of instance layer data onto the first set of instance layer data; and (d) causing the scene to be rendered by providing the third set of instance layer data to an instancing service;

(e) obtaining a fourth set of instance layer data that indicates changes to be made to the scene described by the second set of instance layer data; and (f) generating a fifth set of instance layer data that includes the changes to the scene by overlaying the fourth set of instance layer onto the first and second sets of instance layer data.

18. The computer-implemented method of claim 17, further comprising translating at least some of the sets of instance layer data into a format usable by a software application.

19. The computer-implemented method of claim 17, wherein the changes to the scene include adding an additional instance to the plurality of object instances.

20. The computer-implemented method of claim 19, wherein generating the third set of instance layer data includes, as a result of determining that the second set of instance layer data is additive, adding the second set of instance data to the third set of instance layer data.

21. The computer-implemented method of claim 20, wherein the changes to the scene include a customization to a characteristic of the first set of characteristics.

22. The computer-implemented method of claim 21, wherein generating the third set of instance layer data includes, as a result of determining that the second set of instance layer data includes the customization, applying the customization to the characteristic of the first set of characteristics.

23. The computer-implemented method of claim 21, wherein the customization includes changes to an object instance comprising changes to at least one of a position, an orientation, a size, a scale, a dimension, a color, a texture, a shading, a direction of motion, a reflectiveness, a transparency, an animation sequence, a note, or an object data source.

24. The computer-implemented method of claim 21, wherein the customization includes adding or removing an object instance.

25. The computer-implemented method of claim 21, wherein the customization includes or adding or removing an attribute from an object instance.

26. The computer-implemented method of claim 17, further comprising, with a user interface, receiving instructions from a user regarding the plurality of object instances, the first set of characteristics, or the changes.

* * * * *